US008582783B2

(12) United States Patent
McGrath et al.

(10) Patent No.: US 8,582,783 B2
(45) Date of Patent: Nov. 12, 2013

(54) SURROUND SOUND GENERATION FROM A MICROPHONE ARRAY

(75) Inventors: David Stanley McGrath, Rose Bay (AU); David Matthew Cooper, Chippendale (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 498 days.

(21) Appl. No.: 12/936,432

(22) PCT Filed: Apr. 6, 2009

(86) PCT No.: PCT/US2009/039624
§ 371 (c)(1),
(2), (4) Date: Oct. 5, 2010

(87) PCT Pub. No.: WO2009/126561
PCT Pub. Date: Oct. 15, 2009

(65) Prior Publication Data

US 2011/0033063 A1 Feb. 10, 2011

Related U.S. Application Data

(60) Provisional application No. 61/042,875, filed on Apr. 7, 2008.

(51) Int. Cl.
*H04B 15/00* (2006.01)

(52) U.S. Cl.
USPC ............. 381/92; 381/122; 381/111; 386/314; 348/14.01; 348/231.4

(58) Field of Classification Search
USPC ........... 381/92, 91, 87, 122, 97, 307, 300, 26, 381/1, 61, 356, 150; 348/14.01, 739, 221.1, 348/231.99, 231.3, 231.4, E5.024; 386/314
See application file for complete search history.

(56) References Cited

U.S. PATENT DOCUMENTS

| | | | | |
|---|---|---|---|---|
| 7,340,067 | B2 * | 3/2008 | Murase et al. | 381/92 |
| 7,606,373 | B2 * | 10/2009 | Moorer | 381/18 |
| 2005/0123149 | A1 | 6/2005 | Elko | |
| 2006/0088174 | A1 | 4/2006 | Delleeuw | |
| 2007/0253561 | A1 | 11/2007 | Williams | |
| 2008/0144864 | A1 * | 6/2008 | Huon | 381/305 |

FOREIGN PATENT DOCUMENTS

| | | |
|---|---|---|
| JP | H11-304906 | 11/1999 |
| JP | 2002-223493 | 8/2002 |
| JP | 2006-314078 | 11/2006 |
| JP | 2007-158731 | 6/2007 |
| JP | 2007-281981 | 10/2007 |

* cited by examiner

*Primary Examiner* — Vivian Chin
*Assistant Examiner* — Con P Tran

(57) ABSTRACT

A signal from each of an array of microphones is analyzed. For at least one subset of microphone signals, a time difference is estimated, which characterizes the relative time delays between the signals in the subset. A direction is estimated from which microphone inputs arrive from one or more acoustic sources, based at least partially on the estimated time differences. The microphone signals are filtered in relation to at least one filter transfer function, related to one or more filters. A first filter transfer function component has a value related to a first spatial orientation of the arrival direction, and a second component has a value related to a spatial orientation that is substantially orthogonal in relation to the first. A third filter function may have a fixed value. A driving signal for at least two loudspeakers is computed based on the filtering.

18 Claims, 16 Drawing Sheets

Example Platform 10

Example Platform 10

Example Platform 10

Example Microphone Array 11

Example Impulse Response 130

Example Impulse Response 140

Example Impulse Response 150

Example Impulse Response 160

SURROUND SOUND GENERATION FROM A MICROPHONE ARRAY

CROSS-REFERENCE TO RELATED APPLICATIONS

This application claims priority to U.S. Patent Provisional Application No. 61/042,875, filed 14 Apr. 7, 2008, which is hereby incorporated by reference in its entirety.

TECHNOLOGY

The present invention relates to audio signal processing. More specifically, embodiments of the present invention relate to generating surround sound with a microphone array.

BACKGROUND

Sound channels for audio reproduction may typically include channels associated with a particular source direction. A monophonic ("mono") sound channel may be reproduced with a single loudspeaker. Monophonic sound may thus be perceived as originating from the direction in which the speaker is placed in relation to a listener. Stereophonic ("stereo") uses at least two channels and loudspeakers and may thus increase a sound stage over monophonic sound.

Stereo sound may include distinct audio content on each of two "left" and "right" channels, which may each be perceived as originating from the direction of each of the speakers. Stereo (or mono) channels may be associated with a viewing screen, such as a television, movie screen or the like. As used herein, the term "screen channels" may refer to audio channels perceived as originating from the direction of a screen. A "center" screen channel may be included with left and right stereo screen channels.

As used herein, the term "multi-channel audio" may refer to expanding a sound stage or enriching audio playback with additional sound channels recorded for reproduction on additional speakers. As used herein, the term "surround sound" may refer to using multi-channel audio with sound channels that essentially surround (e.g., envelop, enclose) a listener, or a larger audience of multiple listeners, in relation to a directional or dimensional aspect with which the sound channels are perceived.

Surround sound uses additional sound channels to enlarge or enrich a sound stage. In addition to left, right and center screen channels, surround sound may reproduce distinct audio content from additional speakers, which may be located "behind" a listener. The content of the surround sound channels may thus be perceived as originating from sources that "surround," e.g., "are all around," the listeners. Dolby Digital™ (also called AC-3) is a well known successful surround sound application. Surround sound may be produced with five loudspeakers, which may include the three screen channels left, center and right, as well as a left surround channel and a right surround channel, which may be behind a view of the screen associated with the screen channels. A separate channel may also function, e.g., with a lower bit rate, for reproducing low frequency effects (LFE).

Approaches described in this section could be pursued, but have not necessarily been previously conceived or pursued. Unless otherwise indicated, it should not be assumed that any approaches described in this section qualify as prior art merely by virtue of their inclusion herein. Similarly, issues identified with respect to one or more approaches should not be assumed to have been recognized in any prior art on the basis of this section, unless otherwise indicated.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
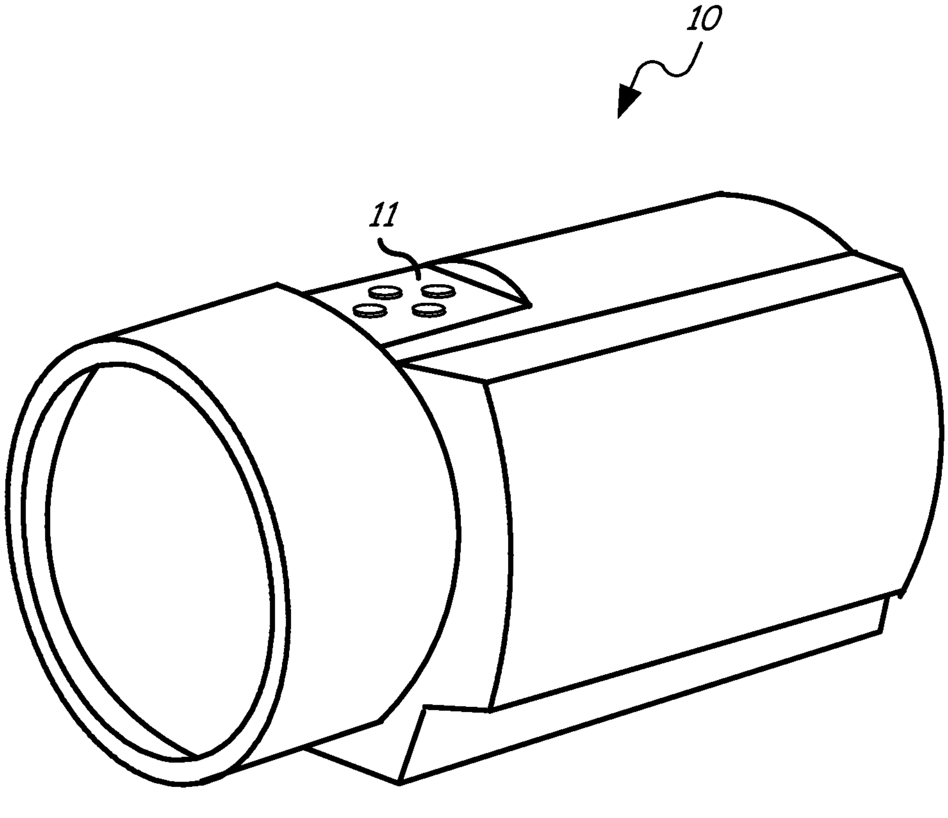
FIG. 1 depicts an example video camera recorder (camcorder), with which an embodiment of the present invention may be practiced.

Example embodiments relating to generating surround sound with a microphone array are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Embodiments of the present invention relate to generating surround sound with a microphone array. A signal from each of an array of microphones is analyzed. For at least one subset of microphone signals, a time difference is estimated, which characterizes the relative time delays between the signals in the subset. A direction is estimated from which microphone inputs arrive from one or more acoustic sources, based at least partially on the estimated time differences. The microphone signals are filtered in relation to at least one filter transfer function, related to one or more filters. A first filter transfer function component has a value related to a first spatial orientation of the arrival direction, and a second component has a value related to a spatial orientation that is substantially orthogonal in relation to the first. A third filter function may have a fixed value. A driving signal for at least two loudspeakers is computed based on the filtering.

Estimating an arrival may include determining a primary direction for an arrival vector related to the arrival direction based on the time delay differences between each of the microphone signals. The primary direction of the arrival vector relates to the first spatial and second spatial orientations. The filter transfer function may relate to an impulse response related to the one or more filters. Filtering the microphone signals or computing the speaker driving signal may include modifying the filter transfer function of one or more of the filters based on the direction signals and mapping the microphone inputs to one or more of the loudspeaker driving signals based on the modified filter transfer function. The first direction signals may relate to a source that has an essentially front-back direction in relation to the microphones. The second direction signals may relate to a source that has an essentially left-right direction in relation to the microphones.

Filtering the microphone signals or computing the speaker driving signal may include summing the output of a first filter that may have a fixed transfer function value with the output of a second filter, which may have a transfer function that is modified in relation to the front-back direction. The second filter output is weighted by the front-back direction signal. Filtering the microphone signals or computing the speaker driving signal may further include summing the output of the first filter with the output of a third filter, which may have a transfer function that may be modified in relation to the left-right direction. The third filter output may be weighted by the left-right direction signal.

Filtering the microphone signals may comprise a first filtering operation. The microphone signals may be modified. The modified microphone signals may be further filtered, e.g., with a reduced set of variable filters in relation to the first filtering step. Intermediate (e.g., "first") output signals may thus be generated. The intermediate output signals may be transformed. The loudspeaker driving signals may be computed based, at least partially, on transforming the intermediate outputs. Modifying the microphone signals may involve mixing the microphone signals with a substantially linear mix operation. Transforming the intermediate output signals may involve a substantially linear mix operation. Methods (e.g., processes, procedures, algorithms or the like) described herein may relate to digital signal processing (DSP), including filtering. The methods described herein may be performed with a computer system platform, which may function under the control of a computer readable storage medium. Methods described herein may be performed with an electrical or electronic circuit, an integrated circuit (IC), an application specific IC (ASIC), or a microcontroller, a programmable logic device (PLD), a field programmable gate array (FPGA) or another programmable or configurable IC.

Example Embodiments

Figure 2:
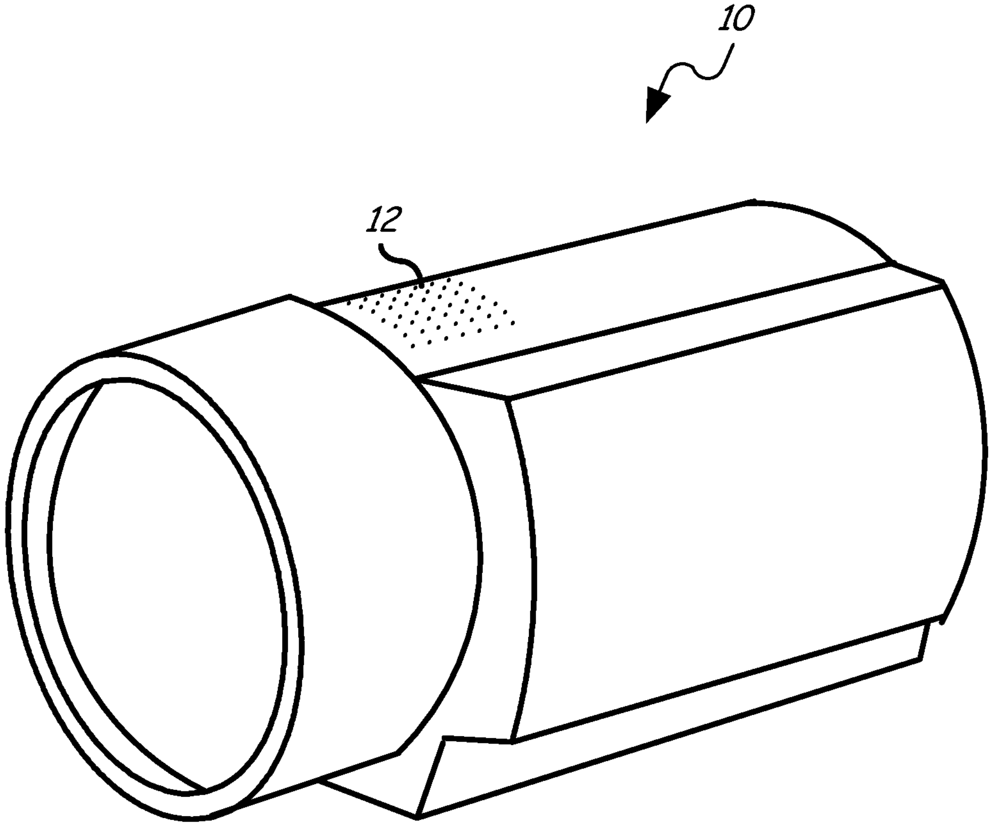
FIG. 2 depicts the example camcorder with another feature.

FIG. 1 depicts an example video camera recorder (camcorder) 10, with which an embodiment may be practiced. Camcorder 10 has an array of microphones 11, arranged for example on an upper surface of camcorder 10. FIG. 2 depicts camcorder 10 with an acoustically transparent grill 12 covering the microphone capsules associated with array 11. In the physical arrangement of array 11, the microphone capsules may have an essentially omni-directional characteristic. An embodiment processes signals from the microphones to produce a multi-channel surround-sound recording suitable for playback on a surround sound speaker system, such as a five-channel speaker set. A five-channel surround sound speaker system may substantially conform to one or more standards or specifications of the International Telecommunications Union (ITU). The terms "speaker" and "loudspeaker" may be used interchangeably herein. Camcorder 10 may comprise a computer system capable of performing a DSP function such as filtering. Alternatively or additionally, camcorder 10 may have an IC component capable of performing a DSP function such as filtering.

An embodiment analyzes signals from microphone array 11 (e.g., microphone signals) to estimate the time-delay difference between the various microphone signals. The time-delay estimates are used to estimate a direction-of arrival estimate. The arrival direction may be estimated as a set of directional components that are substantially orthogonal to each other, for example front-back (X) and left-right (Y) components. Signals for driving the speakers (e.g., speaker driving signals) may be computed from the microphone signals by applying a set of filters. In an embodiment, each filter of the set has a transfer function that comprises a transfer function part (e.g., component) that varies proportionally with X, and a transfer function part that varies proportionally with Y, and may also have a fixed transfer function part. Alternatively, each filter of the set has a transfer function that may vary non-linearly as a function of X or Y, or as a non-linear function of both X and Y.

An embodiment may combine more than two microphone signals together to create time delay estimates. For example, an embodiment may be implemented in which microphone array 11 has three (3) capsules. Signals from three or more microphone capsules may be processed to derive an X, Y arrival direction vector. Signals from the three or more microphone capsules may be mixed in various ways to derive the direction estimates in a two dimensional (2D) coordinate system.

Figure 3:
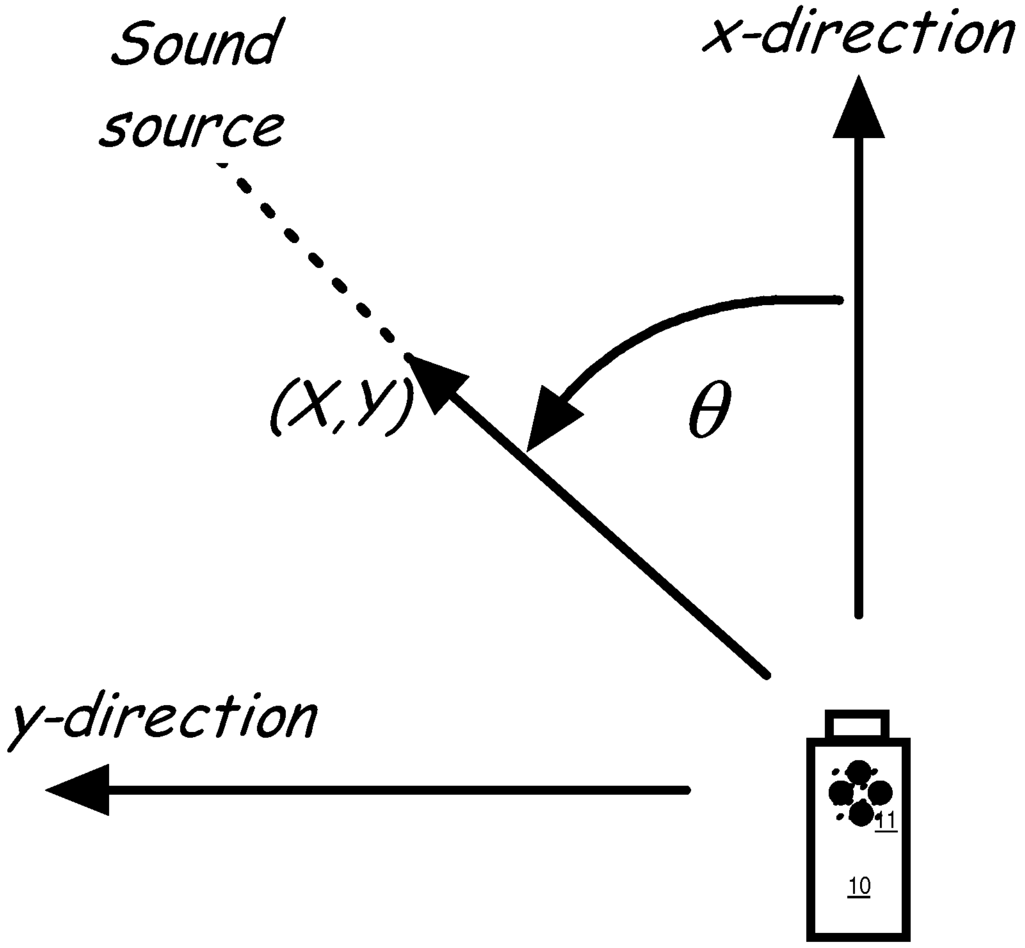
FIG. 3 depicts axes that are arranged orthogonally in relation to each other with an origin at the center of a microphone array.

FIG. 3 depicts axes that are arranged orthogonally in relation to each other with an origin at the center of microphone array 11. The axes are arranged in a plane that is substantially horizontal in relation to microphone array 11. The axis X has a front-back directional orientation in relation to microphone array 11. The axis Y has a left-right directional orientation in relation to microphone array 11. A particular sound arriving at microphone array 11 may be described in relation to an azimuth angle θ (theta), or in terms of a unit vector (X, Y). Equations 1 and 2 below may describe a unit vector (X, Y).

$$X^2+Y^2=1 \quad \text{(Equation 1.)}$$

$$(X,Y)=(\cos(\theta),\sin(\theta)) \quad \text{(Equation 2.)}$$

In formulating the surround output signals, an embodiment may create intermediate signals that correspond to common microphone patterns, including a substantially omni-directional microphone pattern W, a forward facing dipole pattern X and a left-facing dipole pattern Y. Microphone patterns characteristic of these intermediate signals may be described in terms of θ or (X, Y) with reference to the Equations 3A-3C, below.

$$\text{Gain}_W={}^1/_{\sqrt{2}}$$

$$\text{Gain}_X=\cos(\Theta)=X$$

$$\text{Gain}_Y=\sin(\theta)=Y \quad \text{(Equations 3A, 3B, 3C.)}$$

The W, X and Y microphone gains may essentially correspond to first order B-format microphone patterns. Second order B-format microphone patterns may be described for the intermediate signals with reference to Equations 4A-4B, below.

$$\text{Gain}_{X2}=\cos(2\theta)$$

$$\text{Gain}_{Y2}=\sin(2\theta) \quad \text{(Equations 4A, 4B.)}$$

In some circumstances, audio signals received by microphone array 11 may contain sounds that arrive from multiple directions. For example, a portion of the sound arriving at microphone array 11 may be diffuse sound. As used herein, the term "diffuse sound" may refer to sound that arrives from essentially all directions, such as back-ground noise or reverberation. Where microphone signals do not have a specific (e.g., single, isolated, designated), arrival direction, analyzing audio characteristics of the microphone signals may result in a direction-of-arrival vector (X, Y) that has a unitary magnitude. For example, the arrival direction vector that results from analyzing microphone signals that correspond to a sound source with an unspecified arrival direction may have a magnitude that is less than unity. Where there is no dominant direction of arrival (for example, in a sound field that is substantially diffuse), then the direction-of-arrival vector (X, Y) magnitude may approximate zero. With a sound field that is practically diffuse in its entirety, an arrival direction vector magnitude would essentially equal zero (e.g., X=0, Y=0).

Figure 4:
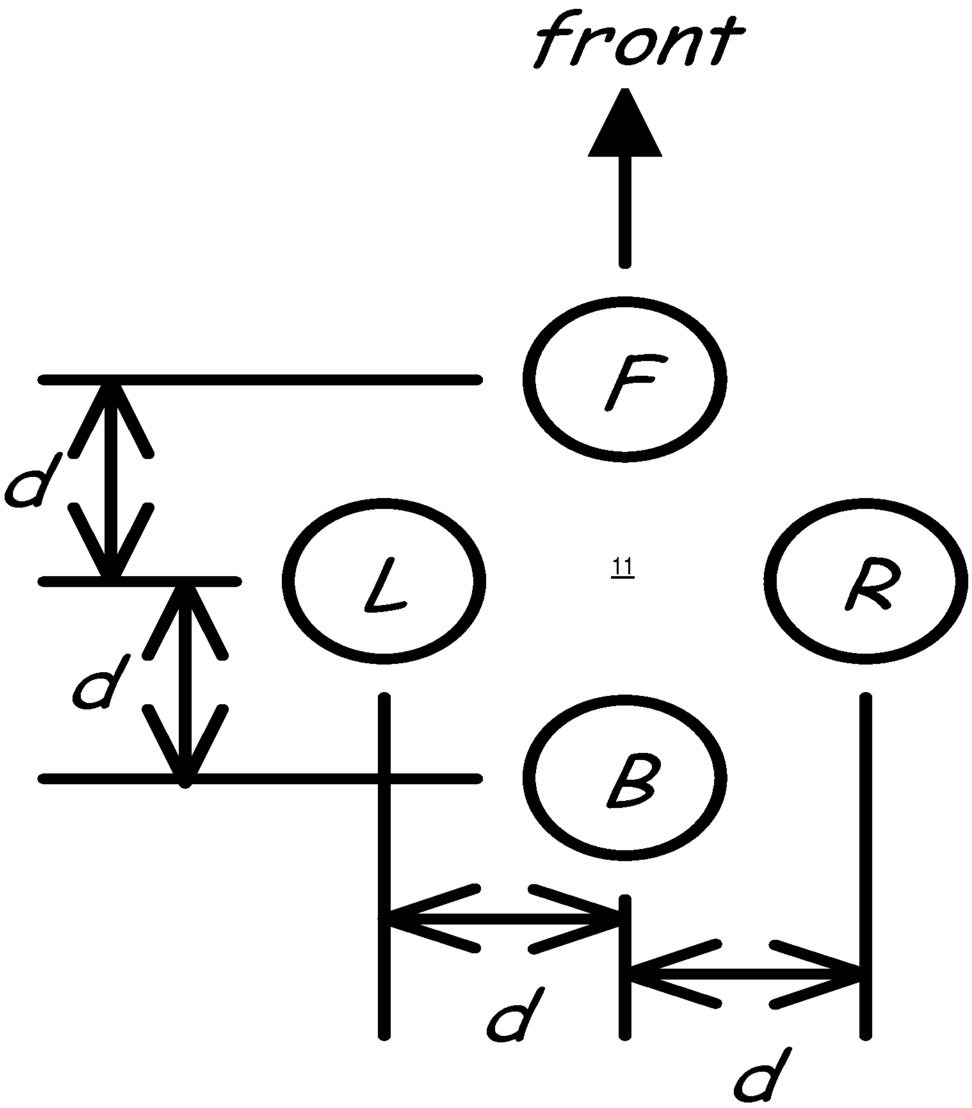
FIG. 4 depicts an example microphone arrangement, with which an embodiment of the present invention may function.

FIG. 4 depicts an example arrangement for microphone array 11, with which an embodiment of the present invention may function. Microphone array has four (4) omni-directional microphone capsules arranged in an essentially diamond shaped pattern, with front and back capsules (F and B) being separated by distance 2*d*, and the left and right capsules (L and R) being separated by the same distance, 2*d*. Embodiments are well suited to function with other arrangements of three (3) or more microphone capsules. The microphone signals from the F, B, L and R capsules may be processed to produce five (5) speaker driving signals. As used herein, the term "speaker signals," "loudspeaker signals," "speaker driving signals," and "loudspeaker driving signals" may be used interchangeably and may refer to signals, generated in response to analysis and/or processing (e.g., filtering) of microphone signals, and which may drive one or more loudspeakers.

Figure 5:
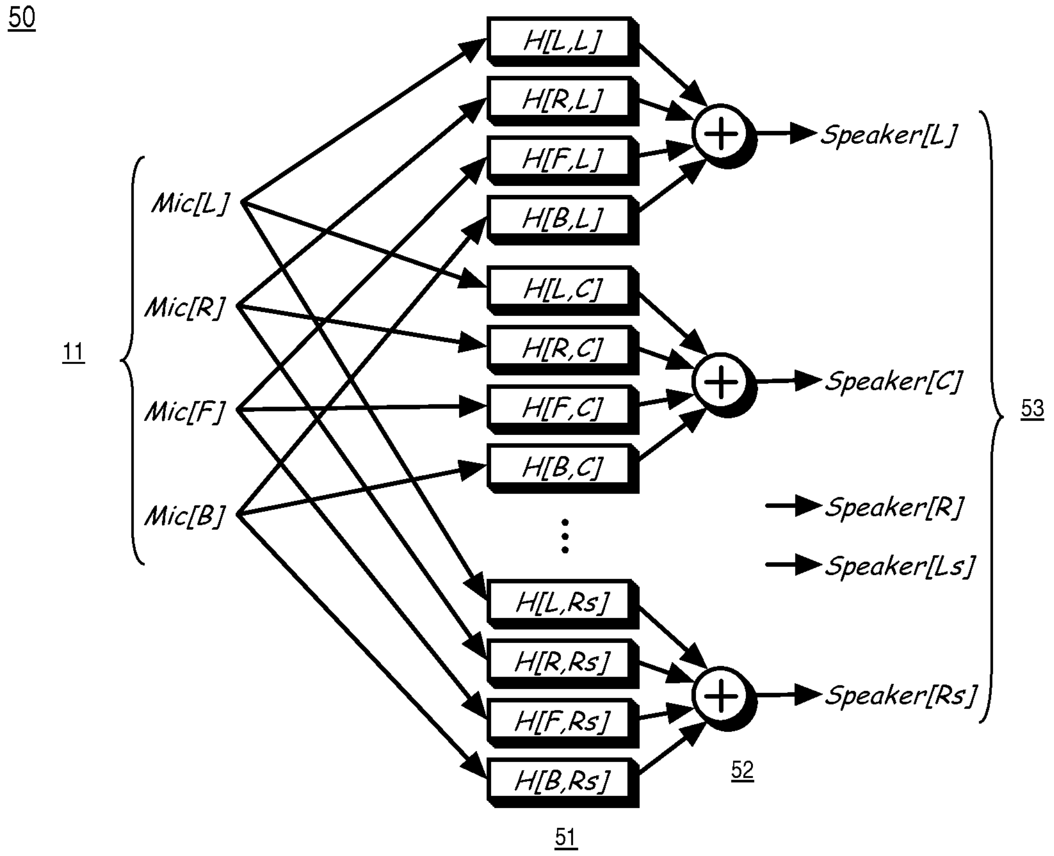
FIG. 5 depicts an example signal processing technique, with which loudspeaker driving signals may be generated.

FIG. 5 depicts an example signal processing technique 50, with which loudspeaker driving signals may be generated. The inputs from each of the four microphone capsules may be mapped to five (5) output signals for driving speakers 53L, 53C, 53R, 53Ls and 53Rs through a bank of twenty (20) (e.g., 4×5) filters 51, each of which has a transfer function H(m,s), and five adders 52. The variable 'm' refers to one of the microphone inputs, and the variable 's' refers to one of the speaker signals. As used herein, in relation to loudspeakers (e.g., speakers) or filter elements (e.g., filter components), the identifiers 'L', 'C', 'R', 'Ls', and 'Rs' may be used to describe the relative directional orientations "left," "center," "right," "left-surround," and "right-surround," respectively, e.g., as may be familiar to, recognized by, and/or used by artisans skilled in fields that relate to audio, audiology, acoustics, psychoacoustics, sound recording and reproduction, signal processing, audio electronics, and the like. The spacing (d) between capsules of microphone array 11 (FIG. 4) may be small relative to long sound wavelengths, which may affect the mapping of the microphone signals that result from low frequency sound to the speaker driver output signals.

Signal processing performed with filter bank 51 and adders 52 may be described with reference to Equations 5A-5E, below.

$$\text{Speaker}_L = \sum_{m\in Mics} \text{Mic}_m \otimes h_{m,L} \quad \text{(Equations 5A, 5B, 5C, 5D, 5E.)}$$

$$\text{Speaker}_C = \sum_{m\in Mics} \text{Mic}_m \otimes h_{m,C}$$

$$\text{Speaker}_R = \sum_{m\in Mics} \text{Mic}_m \otimes h_{m,R}$$

$$\text{Speaker}_{Ls} = \sum_{m\in Mics} \text{Mic}_m \otimes h_{m,Ls}$$

$$\text{Speaker}_{Rs} = \sum_{m\in Mics} \text{Mic}_m \otimes h_{m,Rs}$$

In Equations 5A-5E above and other equations herein, the operator '$\otimes$' indicates convolution, and for each of the filters, the expression '$h_{m,s}$' corresponds to the impulse response '$h_{m,s}$' of a filter element that maps a microphone 'm' to a speaker 's'.

Figure 6:
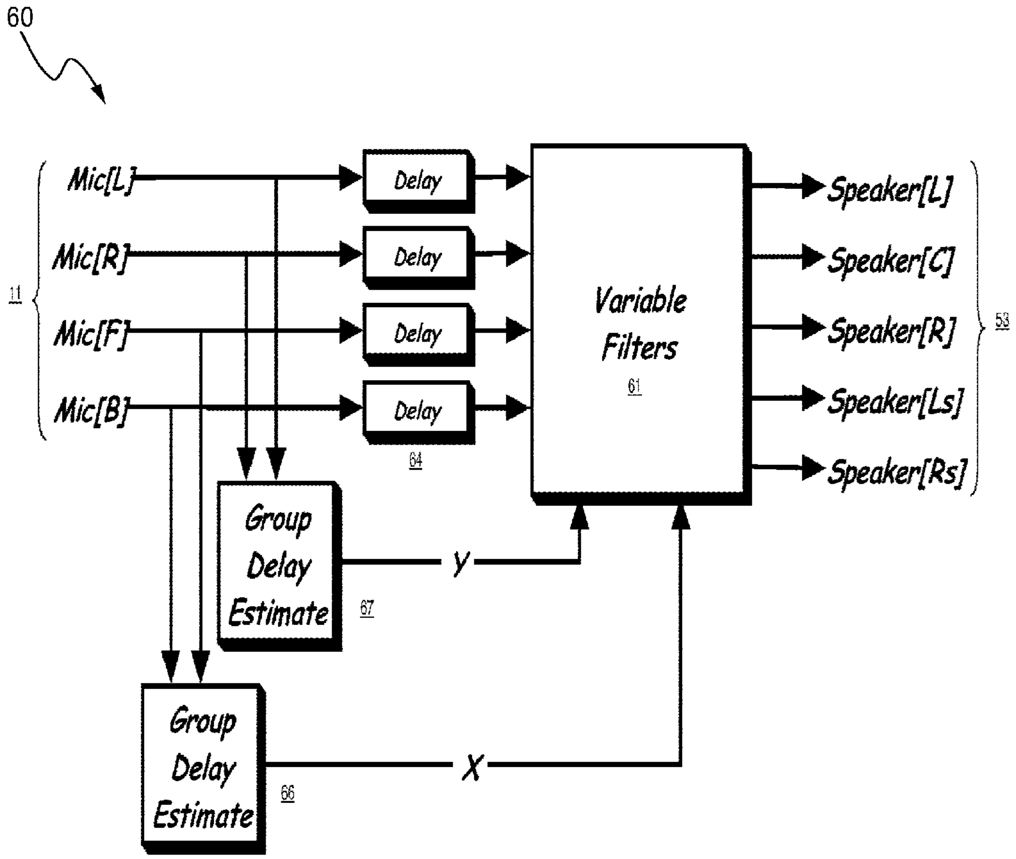
FIG. 6 depicts an example signal processing technique, with which loudspeaker driving signals may be generated, according to an embodiment of the present invention.

FIG. 6 depicts an example signal processing technique 60, with which loudspeaker driving signals may be generated, according to an embodiment of the present invention. Variable filters 61 comprise a set of twenty (20) filters (e.g., filter elements), the transfer function of each of which relate to (e.g., varies as a function of) a function of the variables X and Y. In an implementation, variable filters 61 may resemble, at least partially or conceptually, filters 51 (FIG. 5). Delay lines 64 add delays to the microphone inputs 11L, 11R, 11F and 11B. A duration of the delay added may relate to (e.g., compensate for) a delay value that may be added with the group delay estimate blocks 66 and 67. The delay lines 64 may be in series with the microphone signals, e.g., between the microphone capsules of array 11 and the input of the variable filters 61.

Group delay estimate (GDE) blocks 66 and 67 produce GDE output signals X and Y, respectively. The output signals X and Y of group delay estimate blocks 66 and 67 may be in the range (−1, . . . , +1). The GDE output pair (X, Y) may thus correspond to a direction of arrival vector. Values corresponding to X and Y may change smoothly over time. For example, the X and Y values may be updated, e.g., every sample interval. Alternatively or additionally, X and Y values may be updated less (or more) frequently, such as one update every 10 ms (or another discrete or pre-assigned time value). Embodiments of the present invention are well suited to function efficiently with virtually any X and Y value update frequency. An embodiment may use updated X and Y values from group delay estimate blocks 66 and 67 to adjust, tune or modify the characteristics, behavior, filter function, impulse response or the like of the variable filter block 61 over time. An embodiment may also essentially ignore a time-varying characteristic that may be associated with the X and Y values.

Variable filter 61 may function as described with reference to Equations 6A-6E, below.

(Equations 6A, 6B, 6C, 6D, 6E.)

$$\text{Speaker}_L = \sum_{m\in Mics} \text{Mic}_m \otimes h_{m,L}(X, Y)$$

$$\text{Speaker}_C = \sum_{m\in Mics} \text{Mic}_m \otimes h_{m,C}(X, Y)$$

$$\text{Speaker}_R = \sum_{m\in Mics} \text{Mic}_m \otimes h_{m,R}(X, Y)$$

-continued $$\text{Speaker}_{Ls} = \sum_{m\in Mics} \text{Mic}_m \otimes h_{m,Ls}(X, Y)$$

$$\text{Speaker}_{Rs} = \sum_{m\in Mics} \text{Mic}_m \otimes h_{m,Rs}(X, Y)$$

A configuration or function of filters 61 may resemble a configuration or function of filters 51 (FIG. 5) and thus, Equations 6A-6E may be similar, at least partially, to Equations 5A-5E. The impulse responses h of variable filter 61 are however a function of X and Y, which relate to the components of the direction-of-arrival vector. A filter response $h_{m,s}$ (X, Y) of filters 61 thus describes the impulse response for mapping from a microphone m to a speaker s, in which the impulse response may vary as a function of both X and Y.

In an embodiment, the filter response of variable filters 61 may be described as a first-order function of X and Y, e.g., according to Equation 7, below.

$$h_{m,s}(X,Y)=h_{m,s}^{Fixed}+X\times h_{m,s}^{X}+Y\times h_{m,s}^{Y} \quad \text{(Equation 7.)}$$

The expressions $h^{Fixed}$, $h^X$ and $h^Y$ describe component impulse responses, which may be combined together to form the variable impulse response of filters 61. Based on this first-order version of the variable filter response, Equations 6A-6E may essentially be re-written as Equations 8A-8E, below.

(Equations 8*A*, 8*B*, 8*C*, 8*D*, 8*E*.)

$$\text{Speaker}_L \sum_{m\in Mics} \text{Mic}_m \otimes h_{m,L}^{Fixed} + X \times \sum_{m\in Mics} \text{Mic}_m \otimes h_{m,L}^{X} + Y \times \sum_{m\in Mics} \text{Mic}_m \otimes h_{m,L}^{Y}$$

$$\text{Speaker}_C \sum_{m\in Mics} \text{Mic}_m \otimes h_{m,C}^{Fixed} + X \times \sum_{m\in Mics} \text{Mic}_m \otimes h_{m,C}^{X} + Y \times \sum_{m\in Mics} \text{Mic}_m \otimes h_{m,C}^{Y}$$

$$\text{Speaker}_R \sum_{m\in Mics} \text{Mic}_m \otimes h_{m,R}^{Fixed} + X \times \sum_{m\in Mics} \text{Mic}_m \otimes h_{m,R}^{X} + Y \times \sum_{m\in Mics} \text{Mic}_m \otimes h_{m,R}^{Y}$$

$$\text{Speaker}_{Ls} \sum_{m\in Mics} \text{Mic}_m \otimes h_{m,Ls}^{Fixed} + X \times \sum_{m\in Mics} \text{Mic}_m \otimes h_{m,Ls}^{X} + Y \times \sum_{m\in Mics} \text{Mic}_m \otimes h_{m,Ls}^{Y}$$

$$\text{Speaker}_{Rs} \sum_{m\in Mics} \text{Mic}_m \otimes h_{m,Rs}^{Fixed} + X \times \sum_{m\in Mics} \text{Mic}_m \otimes h_{m,Rs}^{X} + Y \times \sum_{m\in Mics} \text{Mic}_m \otimes h_{m,Rs}^{Y}$$

Embodiments may implement variable filters 61 as such a first-order variable filter bank in one or more ways. For example, from time to time, new values of X and Y are made available from group delay estimation blocks 66 and 67. Upon updating the values X and Y, the impulse responses $h_{m,s}$(X, Y) of variable filters 61, which relate to the arrival direction, may be recomputed according to Equation 7, above. Embodiments may thus process the four microphone input signals from the capsules of microphone array 11 over the twenty filter elements of variable filters 61 to produce the five speaker output signals for driving speakers 53.

Figure 7:
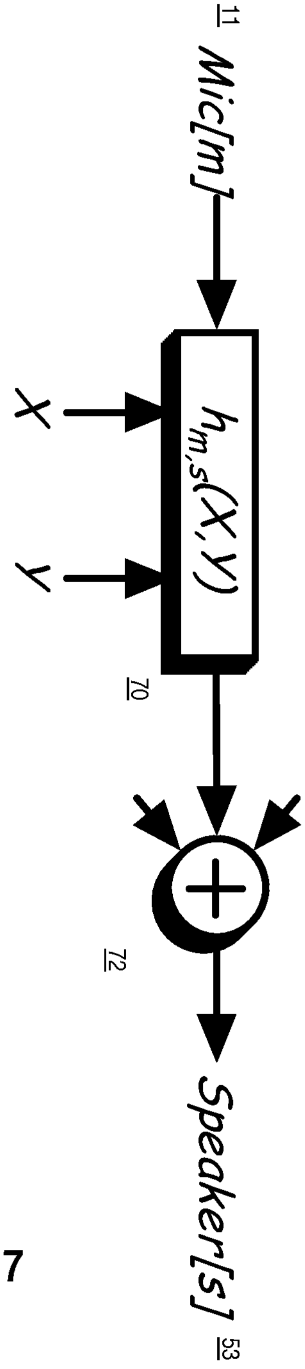
FIG. 7 depicts an example variable filter element, according to an embodiment of the present invention.

FIG. 7 depicts an example variable filter element 70, according to an embodiment of the present invention. Filter element 70 may be a component of filters (e.g., filter bank) 61 (FIG. 6), which may also include nineteen other filter elements that may be similar in function or structure to filter element 70. Outputs from filter element 70 and two or more other filter elements may be summed into an output signal for driving a speaker s (e.g., of filters 53). Variable filters 61 may be implemented with additional fixed filters.

Figure 8:
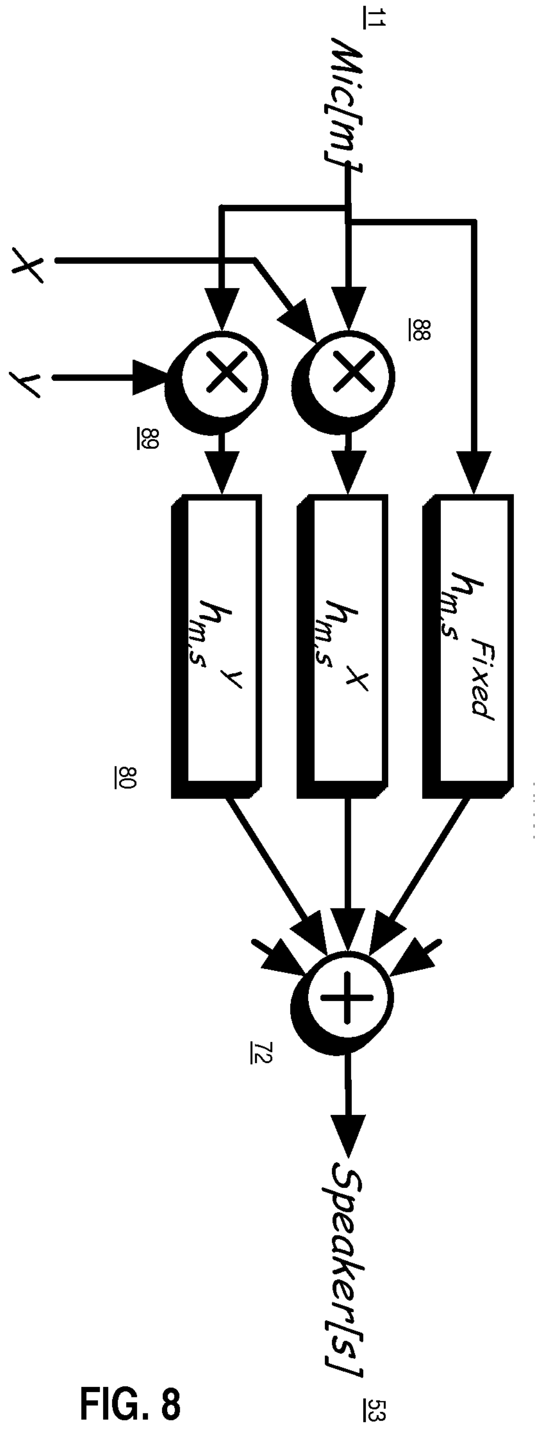
FIG. 8 depicts example filter elements, according to an embodiment of the present invention.

FIG. 8 depicts example filter element 80, according to an embodiment of the present invention. Filter element 80 may have a fixed impulse response component $h^{fixed}$, an impulse response component that relates to a value of X, $h^X$, and an impulse response component that relates to a value of Y, $h^Y$. One or more of the microphone input signals to filter element 80 may be pre-scaled by multipliers 88 and 89, according to values that correspond to X or Y, e.g., prior to processing over the filter element 80.

Figure 9:
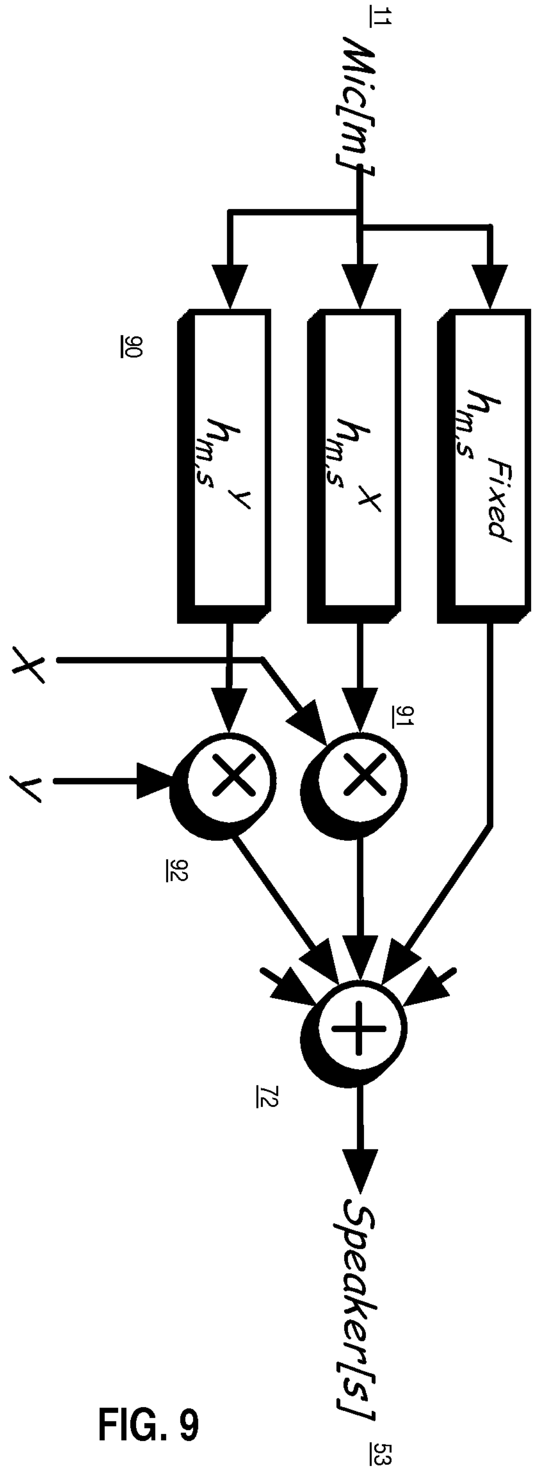
FIG. 9 depicts example filter elements, according to an embodiment of the present invention.

FIG. 9 depicts example filter element 90, according to an embodiment of the present invention. Filter element 90 may have a fixed impulse response component, $h^{fixed}$, an impulse response component that relates to a value of X, $h^X$, and an impulse response component that relates to a value of Y, $h^Y$. One or more of the outputs of filter element 80 may be post-scaled by multipliers 91 and 92, according to values that correspond to X or Y, e.g., after processing over the filter element 80, prior to being summed at summer 72 into outputs for driving a speakers, 53.

An embodiment may implement signal processing, related to pre-scaling or post-scaling, as described with reference to FIG. 8 or FIG. 9, over four microphone inputs to generate five speaker driving outputs with sixty filter elements (e.g., distinct impulse values). Another embodiment may implement signal processing, related to pre-scaling or post-scaling, as described with reference to FIG. 8 or FIG. 9, over four microphone inputs to generate five speaker driving outputs with significantly fewer filter elements. For example, fewer microphone inputs may be used, or symmetry that may characterize intermediate output signals may be used to generate five speaker driving outputs with significantly fewer filter elements.

The four microphone signals from each capsule F, B, L and R of array 11 may be transformed into three transformed microphone signals according to Equation 9, below.

$$\text{Mic}FBLR=\text{Mic}_F+\text{Mic}_B+\text{Mic}_L+\text{Mic}_R$$

$$\text{Mic}FB=\text{Mic}_F-\text{Mic}_B$$

$$\text{Mic}LR=\text{Mic}_L-\text{Mic}_R \quad \text{(Equation 9.)}$$

This resulting simplified set of three transformed microphone signals contains sufficient information to allow the variable filters 61 to function approximately as effectively as when processing over the four original microphone signals. Thus, variable filter 61 may be simplified. For example, transforming four microphone signals to three allows variable filters 61 to be implemented with fifteen (15) filter elements, which may economize on computational resources associated with variable filters 61.

Figure 10:
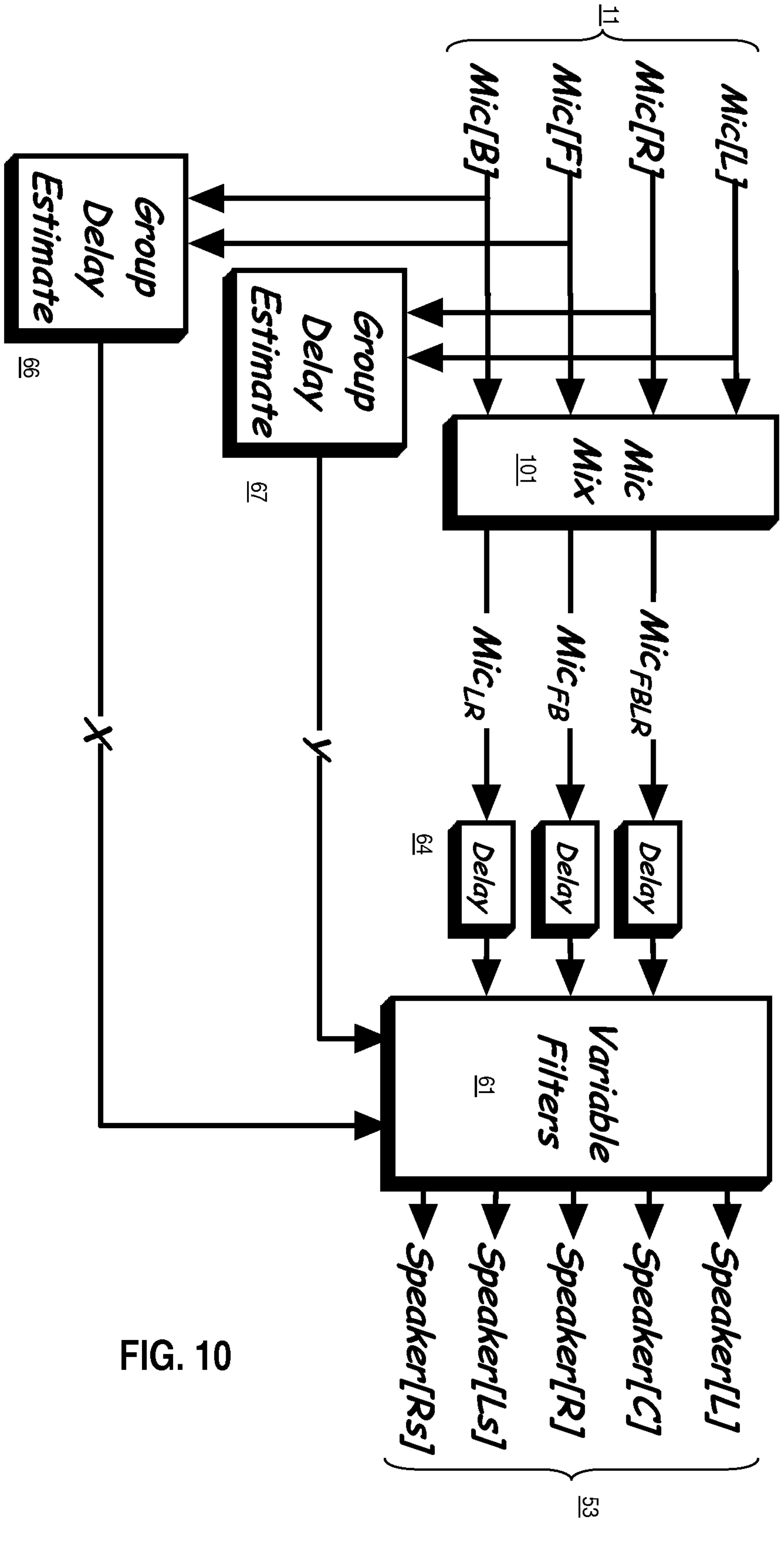
FIG. 10 depicts an example filter with transformed microphone signals, according to an embodiment of the present invention.

FIG. 10 depicts an example filter 61 with transformed microphone signals, according to an embodiment of the present invention. The four input signals corresponding to the F, B, L and R capsules of microphone array 11 are transformed with a microphone mixer 101 into three transformed microphone signals $\text{Mic}_{FBLR}$, $\text{Mic}_{FB}$ and $\text{Mic}_{LR}$. Group delay estimate blocks 66 and 67 may sample the group delay from the four microphone signals F, B, L and R "upstream" of microphone mixer 101. The three transformed microphone signals FBLR, FB and LR provide an input to variable filters 61 through delay lines 64, which may be in series between the microphone mixer 101 and the variable filters 61. In an alternative embodiment, the Group Delay Estimate blocks may be adapted to operate by taking transformed microphone signals from the output of microphone mixer 101.

An embodiment may generate five speaker driving outputs with significantly fewer filter elements using symmetry characteristics of intermediate output signals. For example, intermediate signals $Speaker_W$, $Speaker_X$, $Speaker_Y$, $Speaker_{X2}$ and $Speaker_{Y2}$ may be generated. The intermediate signals $Speaker_W$, $Speaker_X$, $Speaker_Y$, $Speaker_{X2}$ and $Speaker_{Y2}$ may comprise a second order B-format representation of the soundfield. From the intermediate signals $Speaker_W$, $Speaker_X$, $Speaker_Y$, $Speaker_{X2}$ and $Speaker_{Y2}$, “final” speaker driver outputs may be computed by a simple linear mapping, such as described with Equation 10, below.

$$\begin{bmatrix} Speaker_L \\ Speaker_C \\ Speaker_R \\ Speaker_{Ls} \\ Speaker_{Rs} \end{bmatrix} = \begin{bmatrix} 0.2828 & 0.1138 & 0.3503 & -0.2330 & 0.1693 \\ 0.2828 & 0.3684 & 0 & 0.2880 & 0 \\ 0.2828 & 0.1138 & -0.3503 & -0.2330 & -0.1693 \\ 0.2828 & -0.2980 & 0.2165 & 0.0890 & -0.2739 \\ 0.2828 & -0.2980 & -0.2165 & 0.0890 & 0.2739 \end{bmatrix} \times \begin{bmatrix} Speaker_W \\ Speaker_X \\ Speaker_Y \\ Speaker_{X2} \\ Speaker_{Y2} \end{bmatrix} \quad \text{(Equation 10.)}$$

Equation 10 describes a 5×5 matrix, which is an example of a second order B-format decoder of an embodiment. One or more other matrices may be used in another embodiment.

Figure 11:
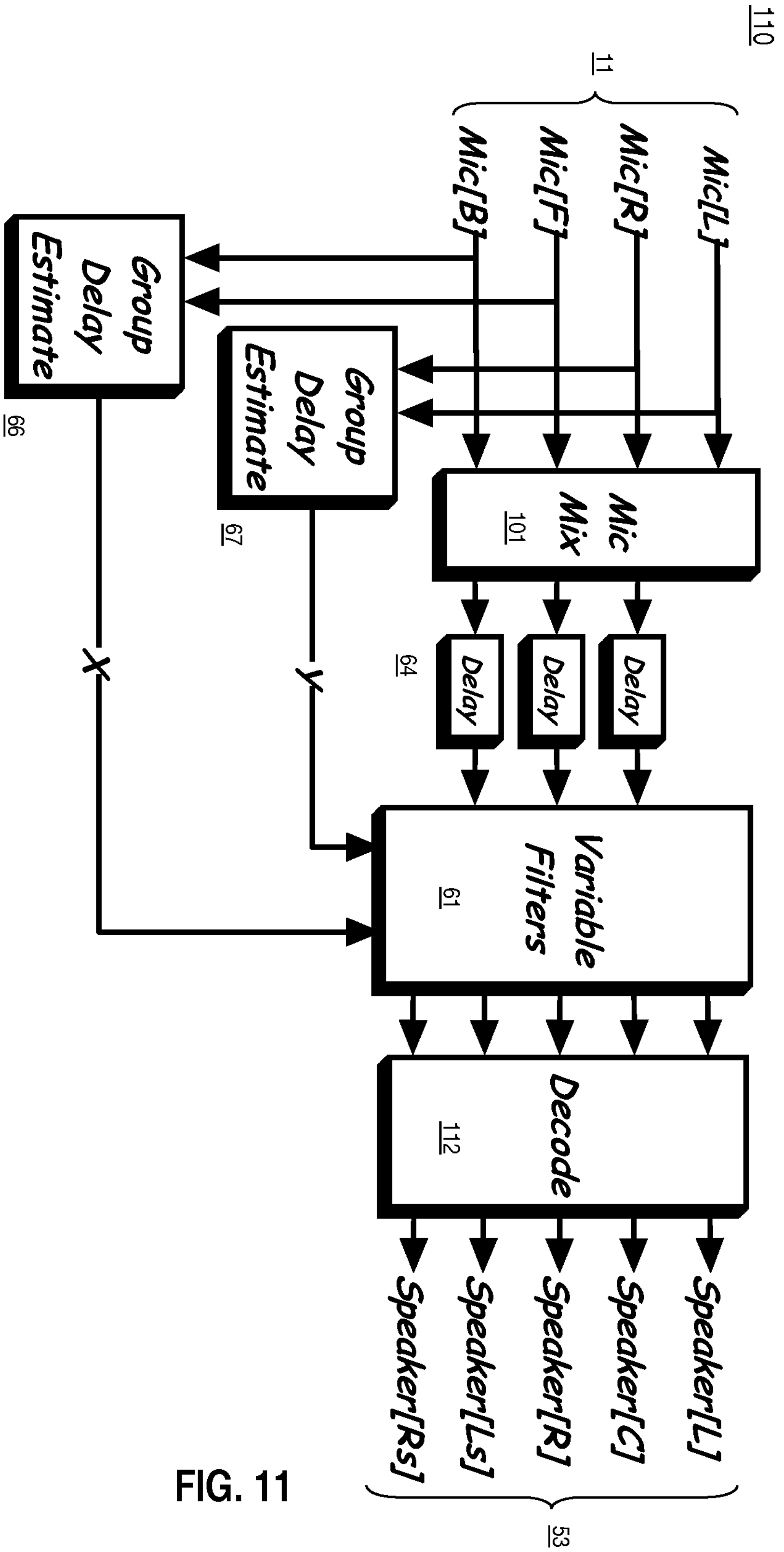
FIG. 11 depicts an example signal processor, according to an embodiment of the present invention.

FIG. 11 depicts an example signal processor 110, according to an embodiment of the present invention. Signal processor 110 has a decoder 112, which may function according to Equation 10 above, “downstream” of variable filters 61 and provides the driver signal outputs for speakers 53.

In signal processor 110, variable filters 61 receives three intermediate inputs from microphone mixer 101 through delay lines 64 and the two group delay estimate inputs X and Y from group delay estimate blocks 66 and 67. Variable filters 61 generate five outputs, which are processed by decoder 112 for driving loudspeakers 53. Variable filters 61 include fifteen (15) variable filter elements, each of which may be varied as a function of X and Y. Implementing filter bank 61 with pre-scaling or post-scaling, such as described above with reference to FIG. 8 and FIG. 9, respectively, uses 45 filters, with three fixed filters used to implement each variable filter. As a practical matter, most of the 45 filters may be obviated in various applications and may thus be omitted. For example, an embodiment may use nine (9) of the 45 filter elements, which may be implemented with impulse responses as described in Equation 11, below.

$$Filter_A = h_{LRFB,W}^{Fixed}$$

$$Filter_B = h_{LRFB,X}^{X} = h_{LFFB,Y}^{Y}$$

$$Filter_C = h_{FB,X}^{Fixed} = h_{LR,Y}^{Fixed} = h_{FB,Y2}^{Y} = h_{FB,Y2}^{X}$$

$$Filter_D = h_{FB,X2}^{X} = -h_{LR,X2}^{Y} \quad \text{(Equation 11.)}$$

In Equation 11, the filter element $h_{LRFB,W}^{Fixed}$ represents a fixed component, which maps from the L+R+F+B microphone input to the $Speaker_W$ intermediate output signal, and $H_{FB,X2}^{X}$ represents an X-variable component, which maps from the F-B microphone input to the $Speaker_{X2}$ intermediate output signal. It should be appreciated that, while nine (9) filter elements (e.g., of the 45 total elements) are non-zero, they may be represented by or characterized with a set of four (4) impulse responses, $Filter_A$, $Filter_B$, $Filter_C$, and $Filter_D$. Thus, an embodiment allows variable filters block 61 to be implemented by a reduced set of filter elements.

Figure 12:
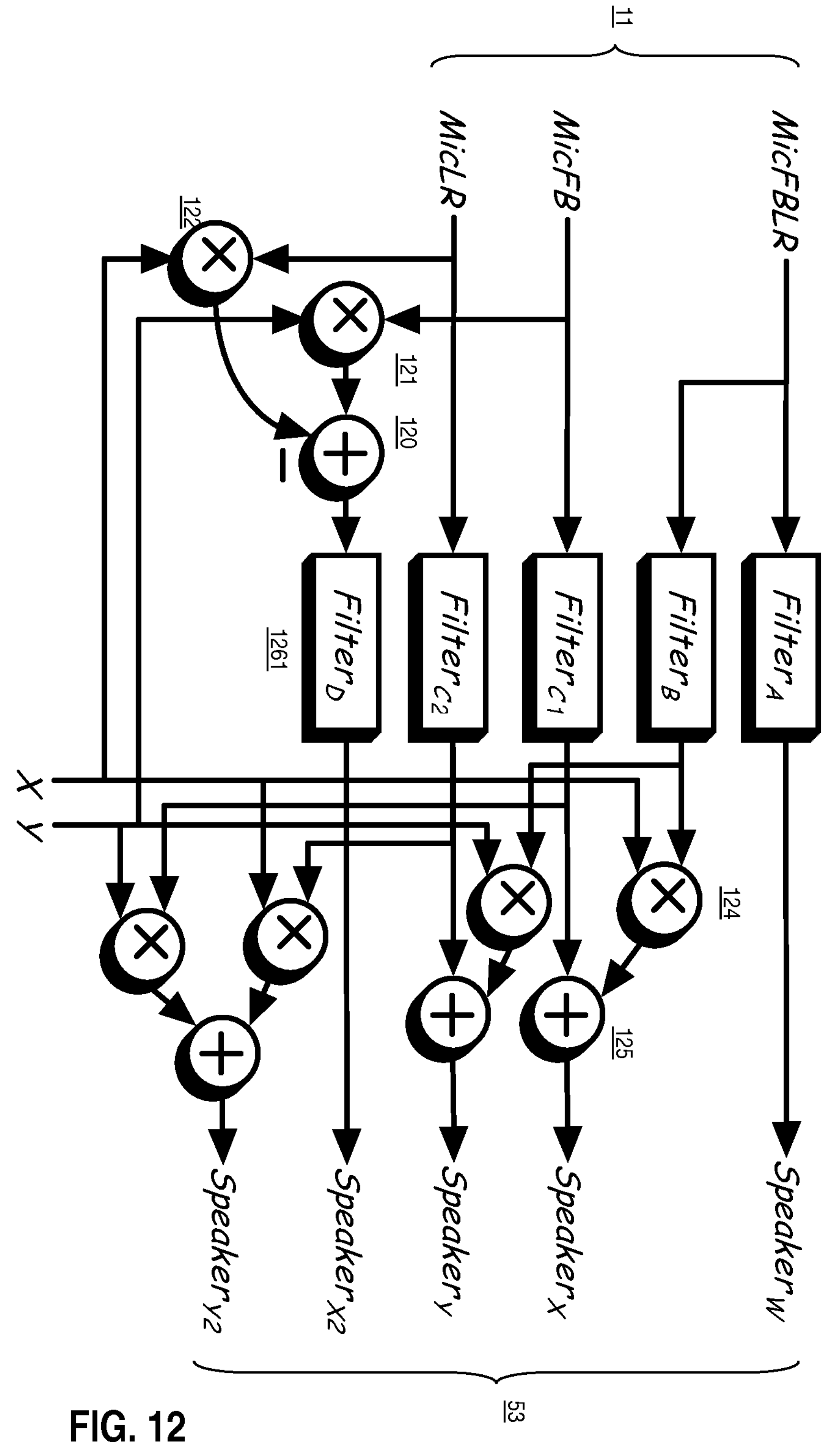
FIG. 12 depicts a variable filter, according to an embodiment of the present invention.
Figure 13:
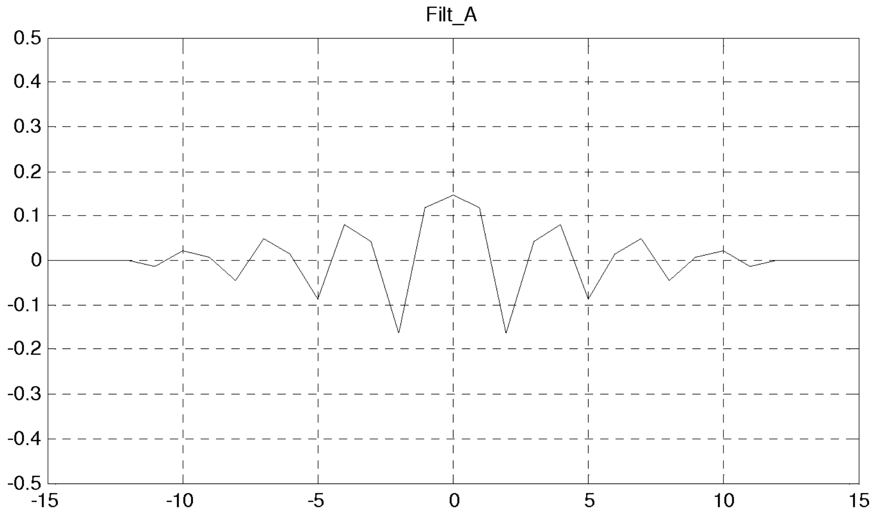
FIG. 13, FIG. 14, FIG. 15 and FIG. 16 depict example impulse responses of filters implemented according to an example embodiment.
Figure 14:
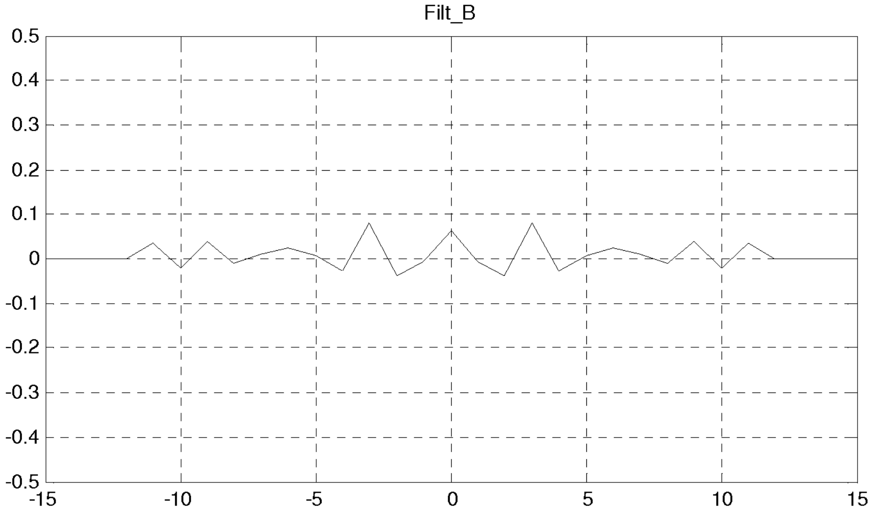
Figure 15:
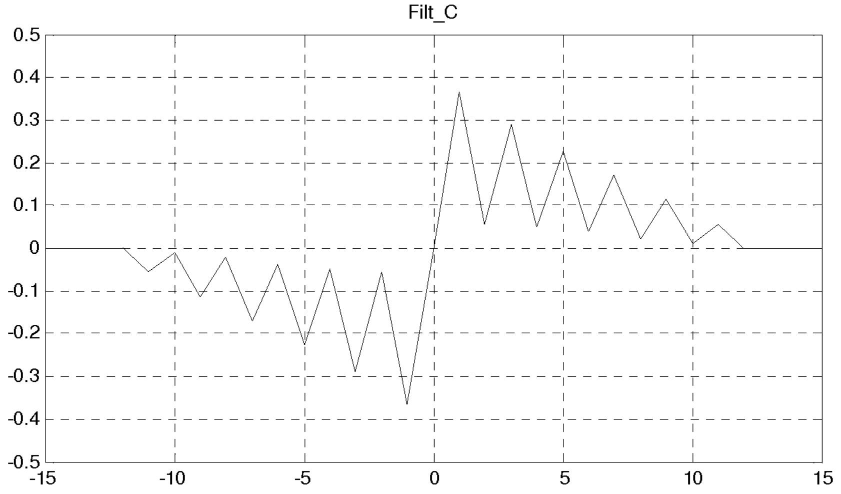
Figure 16:
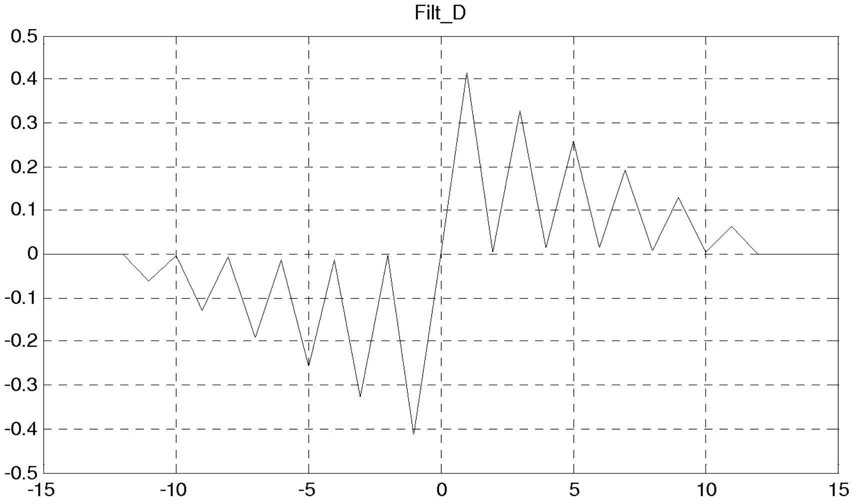

FIG. 12 depicts a variable filter 1261, according to an embodiment of the present invention. Filter 1261 may be implemented with five (5) filter elements, characterized by the impulse responses $Filter_A$, $Filter_B$, $Filter_{C1}$, $Filter_{C2}$ and $Filter_D$. $Filter_{C1}$ and $Filter_{C2}$ each have an impulse response that may be described with the expression ‘$Filter_C$’ in Equation 11, above. Scaling performed over transformed microphone signals FB and LR with multipliers 121, 122 and the group delay estimates X and Y, respectively, are mixed (e.g., subtractively) in adder 120 to form an input to the filter element $Filter_D$. Scaling performed over the outputs of filter elements $Filter_B$, $Filter_{C1}$, $Filter_{C2}$ and $Filter_D$ with multipliers 124 are mixed with adders 125 to generate the driver signals for four of the intermediate signals 53. The intermediate signal $Speaker_W$ may be taken from the output of the filter element $Filter_A$. An embodiment may thus use a symmetry property of the re-mixed microphone signals ($Mic_{F-BLR}$, $Mic_{FB}$ and $Mic_{LR}$) and/or the B-format intermediate signals ($Speaker_W$, $Speaker_X$, $Speaker_Y$, $Speaker_{X2}$ and $Speaker_{Y2}$).

An embodiment may use one or more methods for implementing group delay estimation. For example, group delay estimation blocks 66 and 67 (FIGS. 6, 10, 11) may be configured or implemented to produce a running estimate (e.g., updated periodically, from time to time, etc.) of the time offset between two (2) microphone input signals. For example, an X component of the estimated direction-of-arrival vector may be generated by determining of the time offset between the $Mic_F$ and $Mic_B$ microphone signals. For an acoustic signal that is incident at the microphone array 11 from the front, the value of X may be close to unity (1), because the direction of arrival unit-vector should be pointing along or close to on the X-axis. When X=1, it may be expected that the $Mic_B$ signal may essentially comprise a time-delayed copy or instance of the $Mic_F$ signal, because both microphone capsules may be essentially omni-directional, and thus receive essentially identical or near-identical signals, with different time delays.

An embodiment continuously updates estimates of the relative time offset between two audio signals. For example, where acoustic signals arriving at microphone array 11 include a significant component from azimuth angle θ, the $Mic_B$ signal may approximate the $Mic_F$ signal, with an additional time delay described by Equation 12, below.

$$\tau_{FB} = \frac{2d}{c}\cos\theta \quad \text{(Equation 12.)}$$

In Equation 12, the physical distance between the front and back microphone capsules is represented by the expression 2*d* (e.g., FIG. 4), and c is the speed of sound in air (e.g., dry air at standard temperature and pressure). For some angles of θ, the time difference may be negative. For example, sound may arrive at microphone array 11 from behind (e.g., to the rear of) the array. Thus, the $Mic_B$ signal may precede the $Mic_F$ signal.

An embodiment estimates a "relative group delay," X. Relative group delay X comprises an estimate of the actual group delay, multiplied by a factor of $^{c}/_{2d}$. Thus, the relative group delay X may essentially estimate cos θ. An embodiment may implement estimation of group delay beginning with an initial (e.g., starting) estimate of relative group-delay X. Band pass filtering may then be performed on the two signals, MicF and MicB. Band pass filtering may include high pass filtering, e.g., at 1,000 Hertz (Hz), and low pass filtering, e.g., at 8,000 Hertz. The band passed MicB signal may then be phase shifted, e.g., though a 90 degree phase shift. The band-passed, phase shifted, MicB signal may then be delayed by an equal to Delay=$^{-2Xd}/_{c}$.

A level of correlation may then be determined between the band-passed, phase-shifted, delayed, MicB signal and the band-passed MicF signal. Determining the level of correlation between the band-passed, phase-shifted, delayed, MicB signal and the band-passed MicF signal may include multiplying samples of the two signals together to produce a correlation value. The correlation value may be used to compute a new estimate of the relative group delay according to Equation 13, below.

$$X' = \begin{cases} \text{clip}(X+\delta) & \text{correlation} > 0 \\ \text{clip}(X) & \text{correlation} = 0 \\ \text{clip}(X-\delta) & \text{correlation} < 0 \end{cases} \quad \text{(Equation 13.)}$$

The group delay estimation may be repeated periodically. Thus, the relative group delay estimate X may change over time, which allow embodiments to form a time-varying estimate of cos θ. The update constant δ may be chosen to provide for an appropriate rate of convergence for the iterated update of X. For example, a small value of δ may allow the signal X to vary smoothly as a function of time. In an embodiment, δ may approximate or equal 0.001. Other values for δ may be used.

The 90-degree phase shifted signal may be uncorrelated with the non-phase shifted signal when they remain time-aligned. An embodiment thus functions in which a degree of correlation between the phase shifted signal and the non-phase shifted signal indicates that the signals are other than time-aligned. Moreover, the sign of the correlation (positive or negative) may indicate whether the time delay offset between the signals is positive or negative. Thus, an embodiment uses the sign of the correlation to adjust the relative-group-delay estimate, X.

Referring again to FIG. 4, the X component of the direction of arrival estimate may be formed from the time-delay estimate between the F and B microphone signals, as these two microphone capsules are displaced relative to each other along the X axis (e.g., as described in FIG. 3). An embodiment may use more than two microphone signals to form a group delay estimate. For example, more than two microphone signals may form a group delay estimate where no single microphone pair is oriented in the direction of the desired component.

An embodiment may be implemented with a microphone array 11 in which the capsules are spaced by distance d=7 mm (seven millimeters). Signal processing may be implemented with digital signal processing (DSP), operating on audio signals, which may be sampled at a rate of 48 kHz. In an example embodiment, filters $Filter_A$, $Filter_B$, $Filter_C$, and $Filter_D$, may be implemented as 23-tap finite impulse response (FIR) filters. FIG. 13, FIG. 14, FIG. 15 and FIG. 16 depict example impulse responses of FIR filters implemented according to example embodiments.

Enumerated Example Embodiments

Example embodiments of the present invention may thus relate to one or more of the descriptions that are enumerated below.

1. A method, comprising the steps of:

analyzing a signal from each of an array of microphones;

for at least one subset of microphone signals, estimating a time difference that characterizes the relative time delays between the signals in the subset;

estimating a direction from which a microphone input from one or more acoustic sources, which relate to the microphone signals, arrives at each of the microphones, based at least in part on the estimated time differences;

filtering the microphone signals in relation to at least one filter transfer function, which relates to one or more filters;

wherein the filter transfer function comprises one or more of:

a first transfer function component, which has a value that relates to a first spatial orientation related to the direction of the acoustic sources; and a second transfer function component, which has a value that relates to a second spatial orientation related to the direction of the acoustic sources;

wherein the second spatial orientation is substantially orthogonal in relation to the first spatial orientation; and computing a signal with which to drive at least two loudspeakers based on the filtering step.

2. The method as recited in Enumerated Example Embodiment 1 wherein the filter transfer function further comprises a third transfer function component, which has an essentially fixed value.

3. The method as recited in Enumerated Example Embodiment 1 wherein the step of estimating a direction from which a microphone input arrives from one or more acoustic sources arrive at each of the microphones comprises:

based on the time delay differences between each of the microphone signals, determining a primary direction for an arrival vector related to the arrival direction;

wherein the primary direction of the arrival vector relates to the first spatial orientation and the second spatial orientation.

4. The method as recited in Enumerated Example Embodiment 3 wherein the filter transfer function relates to an impulse response related to the one or more filters.

5. The method as recited in Enumerated Example Embodiment 3 wherein one or more of the filtering step or the computing step comprises the steps of:

modifying the filter transfer function of one or more of the filters based on the direction signals; and mapping the microphone inputs to one or more of the loudspeaker driving signals based on the modified filter transfer function.

6. The method as recited in Enumerated Example Embodiment 5 wherein a first of the direction signals relates to a source that has an essentially front-back direction in relation to the microphones; and wherein a second of the direction signals relates to a source that has an essentially left-right direction in relation to the microphones.

7. The method as recited in Enumerated Example Embodiment 6 wherein one or more of the filtering step or the computing step comprises the steps of:

summing the output of a first filter that has a fixed transfer function value with the output of a second filter;

wherein the transfer function of the second filter is selected to correspond to a modification with the front-back signal direction; and wherein the second filter output is weighted by the front-back direction signal; and further summing the output of the first filter with the output of a third filter;

wherein the transfer function of the third filter is selected to correspond to a modification with the left-right direction; and wherein the third filter output is weighted by the left-right direction signal.

8. The method as recited in Enumerated Example Embodiment 1 wherein the filtering step comprises a first filtering step, the method further comprising the steps of:

modifying the microphone signals;

filtering the modified microphone signals with a second filtering step;

wherein the second filtering step comprises a reduced set of variable filters in relation to the first filtering step;

generating one or more first output signals based on the second filtering step; and transforming the first output signals;

wherein the loudspeaker driving signals comprise a second output signal; and wherein the computing the loudspeaker driving signal step is based, at least in part, on the transforming step.

9. The method as recited in Enumerated Example Embodiment 8 wherein the modifying step comprises the step of mixing the microphone signals with a substantially linear mix operation.

10. The method as recited in Enumerated Example Embodiment 9 wherein the transforming step comprises the step of mixing the first output signals with a substantially linear mix operation.

11. A system, comprising:

means for analyzing a signal from each of an array of microphones;

means for estimating, for at least one subset of microphone signals, a time difference that characterizes the relative time delays between the signals in the subset;

means for estimating a direction from which a microphone input from one or more acoustic sources, which relate to the microphone signals, arrives at each of the microphones, based at least in part on the estimated time differences;

means for filtering the microphone signals in relation to at least one filter transfer function, which relates to one or more filters associated with the filtering means;

wherein the filter transfer function comprises one or more of:

a first transfer function component, which has a value that relates to a first spatial orientation related to the direction of the acoustic sources; and a second transfer function component, which has a value that relates to a second spatial orientation related to the direction of the acoustic sources;

wherein the second spatial orientation is substantially orthogonal in relation to the first spatial orientation; and means for computing a signal with which to drive at least two loudspeakers based on a function of the filtering means.

12. The system as recited in Enumerated Example Embodiment 11 wherein the filter transfer function further comprises a third transfer function component, which has an essentially fixed value.

13. The system as recited in Enumerated Example Embodiment 11 wherein the means for estimating a direction from which a microphone input arrives from one or more acoustic sources arrive at each of the microphones comprises:

means for determining a primary direction for an arrival vector related to the arrival direction, based on the time delay differences between each of the microphone signals;

wherein the primary direction of the arrival vector relates to the first spatial orientation and the second spatial orientation.

14. The system as recited in Enumerated Example Embodiment 13 wherein the filter transfer function relates to an impulse response related to the one or more filters.

15. The system as recited in Enumerated Example Embodiment 13 wherein one or more of the filtering means or the computing means comprises:

means for modifying the filter transfer function of one or more of the filters based on the direction signals; and means for mapping the microphone inputs to one or more of the loudspeaker driving signals based on the modified filter transfer function.

16. The system as recited in Enumerated Example Embodiment 15 wherein a first of the direction signals relates to a source that has an essentially front-back direction in relation to the microphones; and wherein a second of the direction signals relates to a source that has an essentially left-right direction in relation to the microphones.

17. The system as recited in Enumerated Example Embodiment 18 wherein one or more of the filtering means or the computing means comprises:

means for summing the output of a first filter associated with the filtering means, which has a fixed transfer function value, with the output of a second filter associated with the filtering means;

wherein the transfer function of the second filter is selected to correspond to a modification with the front-back signal direction; and wherein the second filter output is weighted by the front-back direction signal; and means for further summing the output of the first filter with the output of a third filter;

wherein the transfer function of the third filter is selected to correspond to a modification with the left-right direction.

18. The method as recited in Enumerated Example Embodiment 11 wherein the filtering means comprises a first filtering means, the system further comprising:

means for modifying the microphone signals;

means for filtering the modified microphone signals with a second filtering step;

wherein the second filtering means comprises a reduced set of variable filters in relation to the first filtering means;

means for generating one or more first output signals based on the second filtering step; and means for transforming the first output signals;

wherein the loudspeaker driving signals comprise a second output signal; and wherein the computing the loudspeaker driving signal step is based, at least in part, on a function of the transforming means.

19. The system as recited in Enumerated Example Embodiment 18 wherein the modifying means comprises means for mixing the microphone signals with a substantially linear mix operation.

20. The system as recited in Enumerated Example Embodiment 18 wherein the transforming means comprises means for mixing the first output signals with a substantially linear mix operation.

21. A computer readable storage medium comprising instructions, which when executed with one or more processors, controls the one or more processors to perform a method, comprising any of the steps recited in Enumerated Example Embodiments 1-10.

22. A computer readable storage medium comprising instructions, which when executed with one or more processors, controls the one or more processors to configure a system, comprising any of the means recited in Enumerated Example Embodiments 11-20.

23. A method for processing microphone input signals from an array of omni-directional microphone capsules to speaker output signals suitable for playback on a surround speaker system, comprising the steps of:

estimating a front-back time difference between one or more front microphone signals and one or more rear microphone signals, the front-back time difference being normalized to a value in the range of approximately negative one to positive one;

estimating a left-right time difference between one or more left microphone signals and one or more right microphone signals, said left-right time difference being normalized to a value in the range of approximately negative one to positive one;

filtering each of the microphone input signal through one or more variable filters;

summing the outputs of one or more variable filters; and generating each of the speaker output signals based on the summed variable filter outputs;

wherein one or more of the variable filters has a transfer function that varies as a function of one or more of the front-back time difference or left-right time difference.

24. The method as recited in Enumerated Example Embodiment 23 wherein each of the variable filters comprises a sum of one or more of a fixed filter component, a front-back-variable filter component that is weighted by the front-back time difference, or a left-right-variable filter component that is weighted by the left-back time difference.

25. A method for processing the microphone input signals from an array of omni-directional microphone capsules to speaker output signals suitable for playback on a surround speaker system, comprising the steps of:

estimating a front-back time difference between one or more front microphone signals and one or more rear microphone signals, the front-back time difference being normalized to a value in the range of approximately negative one to positive one;

estimating a left-right time difference between one or more left microphone signals and one or more right microphone signals, the left-right time difference being normalized to a value in the range of approximately negative one to positive one;

forming a set of pre-processed microphone signals, each of which is formed as a sum of one or more of the microphone input signals each scaled by an input weighting factor;

filtering each of the pre-processed microphone signals through one or more filters;

forming a set of intermediate output signals, each of the intermediate output signals comprising a sum of the outputs of one or more filters, each scaled by an output weighting factor; and generating each of the speaker output signals from the weighted sum of the intermediate output signals;

wherein one or more of the input weighting factors or output weighting factors comprises a function of one or more of the front-back time difference or the left-right time difference.

Equivalents, Extensions, Alternatives and Miscellaneous

Example embodiments relating to generating surround sound with a microphone array are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising the steps of:

analyzing a signal from each microphone of an array of microphones;

wherein the microphone array comprises a plurality of omni-directional microphone capsules, which are spaced in a proximity to each other with a spacing between each of the microphone capsules that is small in relation to sound wavelengths that affect a mapping of a the microphone signals to an output signal that drives at least two loudspeakers;

for at least one subset of microphone signals, estimating a time difference that characterizes the relative time delays between the signals in the subset;

estimating a direction from which a microphone input from one or more acoustic sources, which relate to the microphone signals, arrives at each of the microphones, based at least in part on the estimated time differences;

filtering the microphone signals in relation to at least one filter transfer function, which relates to one or more filters;

wherein said at least one filter transfer function comprises one or more of:

a first transfer function component, which has a value that relates to a first spatial orientation related to the direction of the acoustic sources; and a second transfer function component, which has a value that relates to a second spatial orientation related to the direction of the acoustic sources;

wherein the second spatial orientation is substantially orthogonal in relation to the first spatial orientation; and computing a signal with which to drive the at least two loudspeakers based, at least on part, on the filtering step.

2. The method as recited in claim 1 wherein the filter transfer function further comprises a third transfer function component, which has an essentially fixed value.

3. The method as recited in claim 1 wherein the step of estimating a direction from which a microphone input arrives from one or more acoustic sources arrive at each of the microphones comprises:

based on the time delay differences between each of the microphone signals, determining a primary direction for an arrival vector related to the arrival direction;

wherein the primary direction of the arrival vector relates to the first spatial orientation and the second spatial orientation.

4. The method as recited in claim 3 wherein the filter transfer function relates to an impulse response related to the one or more filters.

5. The method as recited in claim 3 wherein one or more of the filtering step or the computing step comprises the steps of:

modifying the filter transfer function of one or more of the filters based on the direction signals; and mapping the microphone inputs to one or more of the loudspeaker driving signals based on the modified filter transfer function.

6. The method as recited in claim 5 wherein a first of the direction signals relates to a source that has an essentially front-back direction in relation to the microphones; and wherein a second of the direction signals relates to a source that has an essentially left-right direction in relation to the microphones.

7. The method as recited in claim 6 wherein one or more of the filtering step or the computing step comprises the steps of:

summing the output of a first filter that has a fixed transfer function value with the output of a second filter;

wherein the transfer function of the second filter is selected to correspond to a modification with the front-back signal direction; and wherein the second filter output is weighted by the front-back direction signal; and further summing the output of the first filter with the output of a third filter;

wherein the transfer function of the third filter is selected to correspond to a modification with the left-right direction; and wherein the third filter output is weighted by the left-right direction signal.

8. The method as recited in claim 1 wherein the filtering step comprises a first filtering step, the method further comprising the steps of:

modifying the microphone signals;

filtering the modified microphone signals with a second filtering step;

wherein the second filtering step comprises a reduced set of variable filters in relation to the first filtering step;

generating one or more first output signals based on the second filtering step; and transforming the first output signals;

wherein the loudspeaker driving signals comprise a second output signal; and wherein the computing the loudspeaker driving signal step is based, at least in part, on the transforming step.

9. A non-transitory computer readable storage medium comprising instructions, which when executed with one or more processors, controls the one or more processors to perform a method, comprising the steps of:

analyzing a signal from each of an array of microphones;

wherein the microphone array comprises a plurality of omni-directional microphone capsules, which are spaced in a proximity to each other with a spacing between each of the microphone capsules that is small in relation to sound wavelengths that affect a mapping of a the microphone signals to an output signal that drives at least two loudspeakers;

for at least one subset of microphone signals, estimating a time difference that characterizes the relative time delays between the signals in the subset;

estimating a direction from which a microphone input from one or more acoustic sources, which relate to the microphone signals, arrives at each of the microphones, based at least in part on the estimated time differences;

filtering the microphone signals in relation to at least one filter transfer function, which relates to one or more filters;

wherein said at least one filter transfer function comprises one or more of:

a first transfer function component, which has a value that relates to a first spatial orientation related to the direction of the acoustic sources; and a second transfer function component, which has a value that relates to a second spatial orientation related to the direction of the acoustic sources;

wherein the second spatial orientation is substantially orthogonal in relation to the first spatial orientation; and computing a signal with which to drive the at least two loudspeakers based, at least in part, on the filtering step.

10. A system, comprising:

means for analyzing a signal from each of an array of microphones;

wherein the microphone array comprises a plurality of omni-directional microphone capsules, which are spaced in a proximity to each other with a spacing between each of the microphone capsules that is small in relation to sound wavelengths that affect a mapping of a the microphone signals to an output signal that drives at least two loudspeakers;

means for estimating, for at least one subset of microphone signals, a time difference that characterizes the relative time delays between the signals in the subset;

means for estimating a direction from which a microphone input from one or more acoustic sources, which relate to the microphone signals, arrives at each of the microphones, based at least in part on the estimated time differences;

means for filtering the microphone signals in relation to at least one filter transfer function, which relates to one or more filters associated with the filtering means;

wherein said at least one filter transfer function comprises one or more of:

a first transfer function component, which has a value that relates to a first spatial orientation related to the direction of the acoustic sources; and a second transfer function component, which has a value that relates to a second spatial orientation related to the direction of the acoustic sources;

wherein the second spatial orientation is substantially orthogonal in relation to the first spatial orientation; and means for computing a signal with which to drive the at least two loudspeakers based, at least in part, on an output of the filtering means.

11. A method for processing microphone input signals from an array of omni-directional microphone capsules, which are deployed on a handheld audio or audio/video capture device, to speaker output signals suitable for playback on a surround speaker system, the method comprising the steps of:

estimating a front-back time difference between one or more front microphone signals and one or more rear microphone signals, the front-back time difference being normalized to a value in the range of approximately negative one to positive one;

estimating a left-right time difference between one or more left microphone signals and one or more right microphone signals, said left-right time difference being normalized to a value in the range of approximately negative one to positive one;

filtering each of the microphone input signal through one or more variable filters;

summing the outputs of said one or more variable filters; and generating each of the speaker output signals based on the summed variable filter outputs;

wherein one or more of the variable filters has a transfer function that varies as a function of one or more of said front-back time difference or said left-right time difference.

12. The method as recited in claim 11 wherein each of the variable filters comprises a sum of one or more of a fixed filter component, a front-back-variable filter component that is weighted by the front-back time difference, or a left-right-variable filter component that is weighted by the left-right time difference.

13. A system for processing microphone input signals from an array of omni-directional microphone capsules, which are deployed on a handheld audio or audio/video capture device, to speaker output signals suitable for playback on a surround speaker system, the system comprising:

means for estimating a front-back time difference between one or more front microphone signals and one or more rear microphone signals, the front-back time difference being normalized to a value in the range of approximately negative one to positive one;

means for estimating a left-right time difference between one or more left microphone signals and one or more right microphone signals, said left-right time difference being normalized to a value in the range of approximately negative one to positive one;

means for filtering each of the microphone input signal through one or more variable filters;

means for summing the outputs of said one or more variable filters; and means for generating each of the speaker output signals based on the summed variable filter outputs;

wherein one or more of the variable filters has a transfer function that varies as a function of one or more of said front-back time difference or said left-right time difference.

14. The system as recited in claim 13 wherein each of the variable filters comprises a sum of one or more of a fixed filter component, a front-back-variable filter component that is weighted by the front-back time difference, or a left-right-variable filter component that is weighted by the left-right time difference.

15. A non-transitory computer readable storage medium comprising instructions stored therewith, which when executed with one or more processors, controls the one or more processors to perform one or more of:

control of one or more of:

a use for a computer system;

a process for processing microphone input signals from an array of omni-directional microphone capsules, which are deployed on a handheld audio or audio/video capture device, to speaker output signals suitable for playback on a surround speaker system, wherein the computer system use or the process comprises:

estimating a front-back time difference between one or more front microphone signals and one or more rear microphone signals, the front-back time difference being normalized to a value in the range of approximately negative one to positive one;

estimating a left-right time difference between one or more left microphone signals and one or more right microphone signals, said left-right time difference being normalized to a value in the range of approximately negative one to positive one;

filtering each of the microphone input signal through one or more variable filters;

summing the outputs of said one or more variable filters; and generating each of the speaker output signals based on the summed variable filter outputs;

wherein one or more of the variable filters has a transfer function that varies as a function of one or more of said front-back time difference or said left-right time difference; or program or control configuration of a system, which comprises means for performing or controlling the process.

16. A method for processing the microphone input signals from an array of omni-directional microphone capsules, which are deployed on a handheld audio or audio/video capture device, to speaker output signals suitable for playback on a surround speaker system, the method comprising the steps of:

estimating a front-back time difference between one or more front microphone signals and one or more rear microphone signals, the front-back time difference being normalized to a value in the range of approximately negative one to positive one;

estimating a left-right time difference between one or more left microphone signals and one or more right microphone signals, the left-right time difference being normalized to a value in the range of approximately negative one to positive one;

forming a set of pre-processed microphone signals, each of which is formed as a sum of one or more of the microphone input signals each scaled by an input weighting factor;

filtering each of the pre-processed microphone signals through one or more filters;

forming a set of intermediate output signals, each of the intermediate output signals comprising a sum of the outputs of said one or more filters, each scaled by an output weighting factor; and generating each of the speaker output signals from the weighted sum of the intermediate output signals;

wherein one or more of the input weighting factors or output weighting factors comprises a function of one or more of the front-back time difference or the left-right time difference.

17. A system for processing the microphone input signals from an array of omni-directional microphone capsules, which are deployed on a handheld audio or audio/video capture device, to speaker output signals suitable for playback on a surround speaker system, the system comprising:

means for estimating a front-back time difference between one or more front microphone signals and one or more rear microphone signals, the front-back time difference being normalized to a value in the range of approximately negative one to positive one;

means for estimating a left-right time difference between one or more left microphone signals and one or more right microphone signals, the left-right time difference being normalized to a value in the range of approximately negative one to positive one;

means for forming a set of pre-processed microphone signals, each of which is formed as a sum of one or more of the microphone input signals each scaled by an input weighting factor;

means for filtering each of the pre-processed microphone signals through one or more filters;

means for forming a set of intermediate output signals, each of the intermediate output signals comprising a sum of the outputs of said one or more filters, each scaled by an output weighting factor; and means for generating each of the speaker output signals from the weighted sum of the intermediate output signals;

wherein one or more of the input weighting factors or output weighting factors comprises a function of one or more of the front-back time difference or the left-right time difference.

18. A non-transitory computer readable storage medium comprising instructions stored therewith, which when executed with one or more processors, controls the one or more processors to perform one or more of:

control of one or more of:

a use for a computer system;

a process for processing the microphone input signals from an array of omni-directional microphone capsules, which are deployed on a handheld audio or audio/video capture device, to speaker output signals suitable for playback on a surround speaker system, the method comprising the steps of:

estimating a front-back time difference between one or more front microphone signals and one or more rear microphone signals, the front-back time difference being normalized to a value in the range of approximately negative one to positive one;

estimating a left-right time difference between one or more left microphone signals and one or more right microphone signals, the left-right time difference being normalized to a value in the range of approximately negative one to positive one;

forming a set of pre-processed microphone signals, each of which is formed as a sum of one or more of the microphone input signals each scaled by an input weighting factor;

filtering each of the pre-processed microphone signals through one or more filters;

forming a set of intermediate output signals, each of the intermediate output signals comprising a sum of the outputs of said one or more filters, each scaled by an output weighting factor; and generating each of the speaker output signals from the weighted sum of the intermediate output signals;

wherein one or more of the input weighting factors or output weighting factors comprises a function of one or more of the front-back time difference or the left-right time difference; or program or control configuration of a system, which comprises means for performing or controlling the process.

* * * * *